US009338747B1

(12) United States Patent
Parthasarathy et al.

(10) Patent No.: US 9,338,747 B1
(45) Date of Patent: May 10, 2016

(54) WIRELESS COVERAGE ASSIST

(75) Inventors: Rangaprabhu Parthasarathy, San Jose, CA (US); Kiran K. Edara, Cupertino, CA (US); Viritha Yella, Santa Clara, CA (US); Kaixiang Hu, Cupertino, CA (US)

(73) Assignee: Amazon Technologies, Inc., Reno, NV (US)

( * ) Notice: Subject to any disclaimer, the term of this patent is extended or adjusted under 35 U.S.C. 154(b) by 353 days.

(21) Appl. No.: 13/494,818

(22) Filed: Jun. 12, 2012

(51) Int. Cl.
*H04W 24/00* (2009.01)
*H04W 52/02* (2009.01)
*H04W 28/02* (2009.01)

(52) U.S. Cl.
CPC ...... *H04W 52/0245* (2013.01); *H04W 28/0226* (2013.01)

(58) Field of Classification Search
CPC .................. H04W 52/0245; H04W 28/0226
USPC .......................................................... 455/425
See application file for complete search history.

(56) References Cited

U.S. PATENT DOCUMENTS

| | | | | |
|---|---|---|---|---|
| 7,952,363 B2* | 5/2011 | Jones | ................. | G01R 29/0892 324/544 |
| 8,185,145 B1* | 5/2012 | Srinivas | .............. | H04W 52/283 455/522 |
| 8,509,810 B2* | 8/2013 | Sanders et al. | ............. | 455/456.1 |
| 8,588,789 B2* | 11/2013 | Kim | .................. | H04W 36/0083 340/968 |
| 8,634,796 B2* | 1/2014 | Johnson | ..................... | 455/404.1 |
| 2006/0030270 A1* | 2/2006 | Cheng | ......................... | 455/67.11 |
| 2007/0147595 A1* | 6/2007 | Daniell | .................... | H04M 3/46 379/207.02 |
| 2007/0263551 A1* | 11/2007 | Birchler | ................ | H04L 45/123 370/254 |
| 2008/0153483 A1* | 6/2008 | Abu-Amara | ................ | 455/432.1 |
| 2010/0111057 A1* | 5/2010 | Nakamura | ........ | H04W 36/0061 370/338 |
| 2012/0202521 A1* | 8/2012 | Shkedi | ........................ | 455/456.1 |

* cited by examiner

*Primary Examiner* — Qun Shen
(74) *Attorney, Agent, or Firm* — Polsinelli LLP

(57) ABSTRACT

Approaches in accordance with various embodiments can utilize loss of service and call drop information to anticipate connection events between a computing device and a cellular or data network. The utilize loss of service and call drop information is compiled from past connection events from many devices and is utilizes by the computing device to determine areas historically associated with greater connection reliability (or strength of connectivity) upon at least detecting a condition indicative of a connection event. Accordingly, a user can be notified upon entering or moving toward an area associated with poor connection reliability. The user can further be directed to an area associated with greater connection reliability to ensure sufficient network coverage to carry out a phone call.

21 Claims, 8 Drawing Sheets

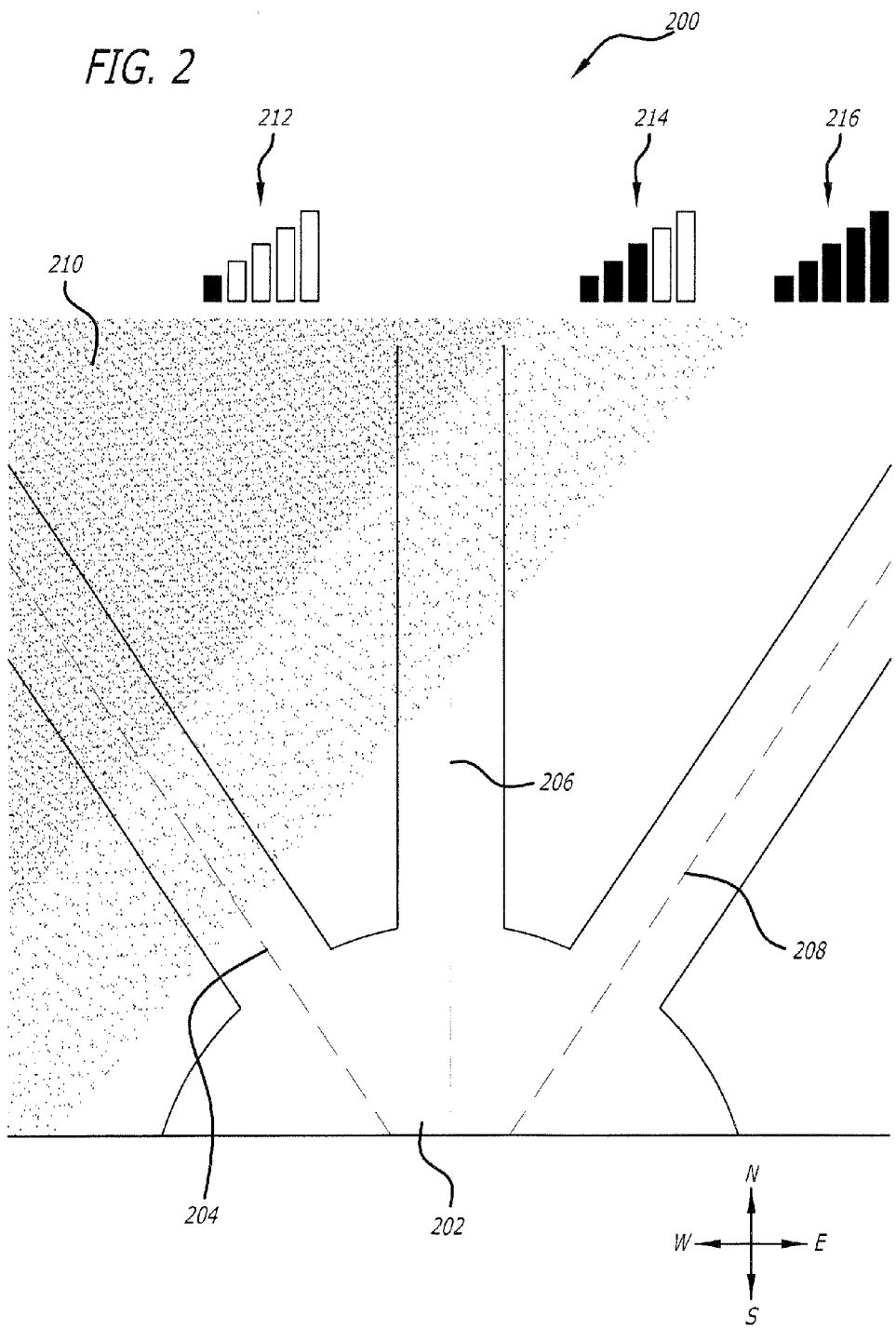

WIRELESS COVERAGE ASSIST

BACKGROUND

People are increasingly relying on computing devices in more areas of their lives. As the technology of computing devices outpaces the technology of the networks these devices rely on, and as these devices become ever more intelligent, it becomes increasingly undesirable for users to blindly rely on the accountability and reach of these networks alone. Conventional systems and approaches have produced various network coverage maps for users to determine areas of coverage, but these systems have been limited by information available to them.

BRIEF DESCRIPTION OF THE DRAWINGS

Various embodiments in accordance with the present disclosure will be described with reference to the drawings, in which:

FIG. 2 illustrates an example region with varying levels of signal strength in accordance with at least one embodiment;

DETAILED DESCRIPTION

Figure 1:
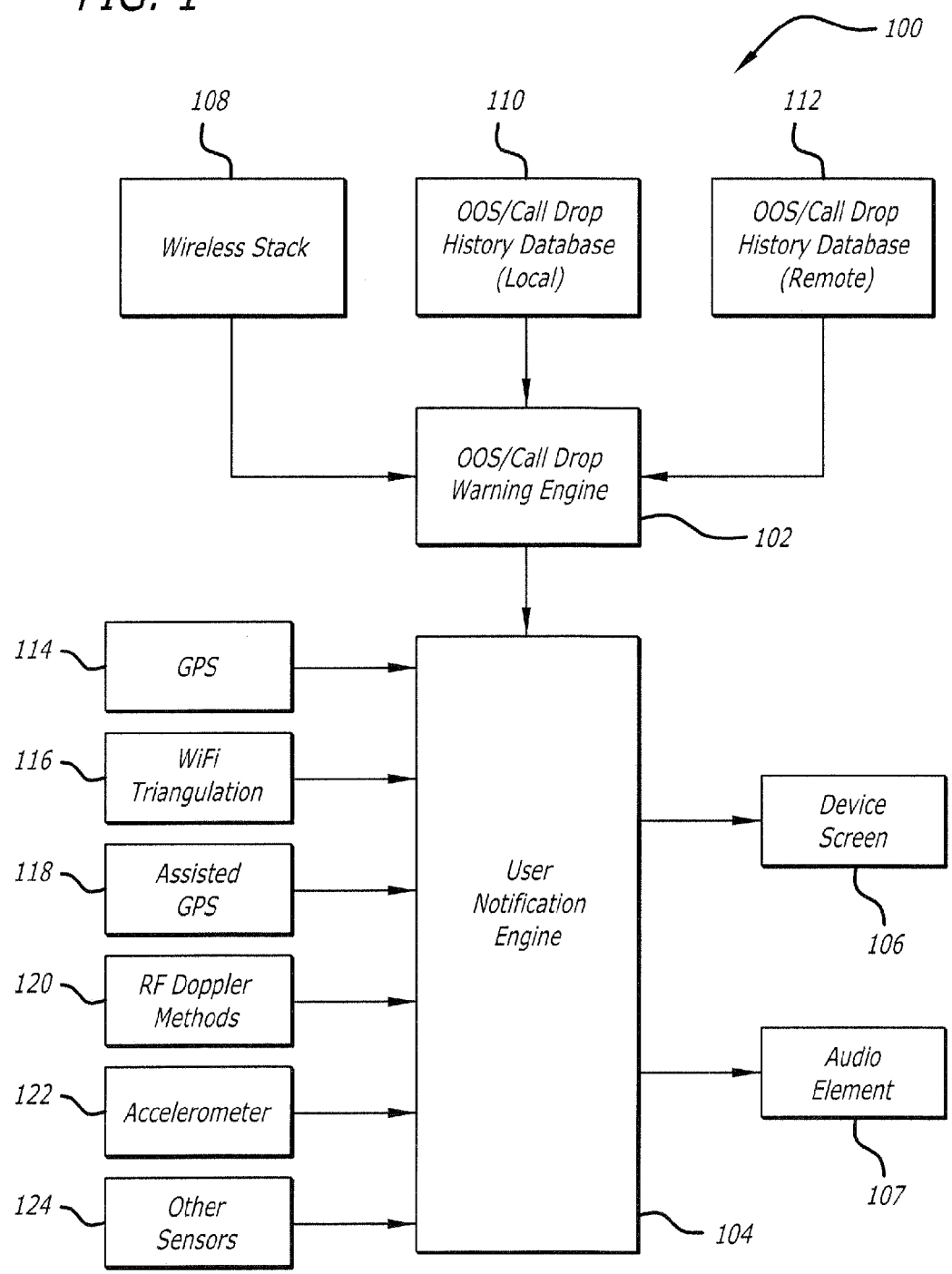
FIG. 1 illustrates an example configuration of components of a computing device such as that illustrated in accordance with various embodiments.

Systems and methods in accordance with various embodiments of the present disclosure may overcome one or more of the aforementioned and other deficiencies experienced in conventional approaches to providing users with network information. In particular, approaches discussed herein enable a computing device to detect connectivity related issues in order to warn a user of possible connection events before an event occurs. In at least some embodiments, the computing device contacts a remoter server, service, or other such entity to obtain signal strength or connection reliability data pertaining to past connection event information for one or more regions. This connection reliability data provides information about the strength of connectivity of the computing device with the network. Among at least some implementations, the connection reliability information can be utilized by the device to warn the user of areas historically associated with poor connection reliability (or poor strength of connectivity), or other network connectivity issues, and guide the user to one or more areas with at least sufficient connection reliability to maintain a network connection for the duration of an activity, such as an active phone call or attempted call, for example.

The signal in some embodiments can correspond to a cellular signal provided by one or more cellular service providers or, for example, a wifi signal or other data network. Conventional cellular service providers typically utilize cell sites that link mobile computing devices to switching software that handles call routing. The cell sites, sometimes referred to as cell towers, are sites where antennas and electronic communications equipment, such as transceivers (receivers/transmitters), digital signal processors, control electronics, Global Positioning System (GPS) equipment, power sources, and the like, are located. These sites can be used to transmit data to mobile computing devices, such as smartphones, cell phones, tablet computers, laptops, and the like, as well as various non-mobile devices. Areas where computing devices are unable to communicate with at least one nearby cell site, base station, router, or repeater in order to transmit and receive data are known as dead zones. Dead zones often occur when the signal is blocked or too weak for the device to be able to utilize. Signals can be blocked, for example, as a result of thick walls, hills, mountain, or other obstructions. These example causes are relatively fixed and can be identified as problem areas through the aggregation of connection event data for a particular geographic location. Similar issues arise with other types of wireless communication signals as well.

Approaches in accordance with various embodiments can utilize connection event data to anticipate a connection event between a computing device and a cellular or data network. A computing device or system, application, service, or other such entity (hereinafter "computing device" for purposes of simplicity) can receive push updates of connection event data, or the computing device can pull these updates, for one or more regions from one or more servers. The connection event data may also be stored locally on the computing device. The connection event data can comprise information compiled from past connection events from many devices, and can be utilized to determine areas historically associated with greater connection reliability upon at least detecting a condition indicative of a connection event. Accordingly, a user can be notified during a phone call or when attempting to place a call, for example, upon entering or moving toward an area associated with poor connection reliability, such as by having poor signal strength (or poor strength of connectivity), such as when being in a location out of range of a cell site or when a signal is obstructed by an one or more objects. The user can further be directed to an area associated with greater signal strength to ensure call success.

In at least some embodiments, a connection event can at least include a dropped call, which can be a result of poor connection reliability or as a result of an unsuccessful handoff between cell sites, for example. Further, a connection event, as described herein, can at least include the inability to connect to a network as a result of poor connection reliability or as a result of too many people trying to access the network through the same cell site simultaneously (e.g. during a traffic jam, large events, inside sport arenas or stadiums, during disasters, etc.). The connection event data for various events can at least include the number identifier of the cell site where an event occurred, the GPS coordinates of the event, the Public Land Mobile Network (PLMN) ID, a cause of the connection event, a time and date of the event, and the like.

Various other applications, processes, and uses are presented below with respect to the various embodiments.

FIG. 1 illustrates an example set of components 100 for a system in accordance with various embodiments. It should be understood that there can be additional, fewer, or alternative components or modules to perform similar or alternative tasks, within the scope of the various embodiments unless otherwise stated. The set of components 100 includes a computing device screen 106 and an audio element 107, such as a speaker, to provide a user with visual and/or audible notifications in addition to performing the tasks traditionally provided by these elements. The visual notifications are generated by a user notification engine 104 that is supplied data for generating appropriate notifications in response to various network conditions. The data for generating appropriate notifications is provided by a warning engine 102 and various other situation determining sensors, which can at least include a global positioning system (GPS) sensor 114, a WiFi triangulation module 116, an assisted GPS (A-GPS) module 118, a radio frequency (RF) Doppler module 120, an accelerometer 122, and various other sensors 124, such as a gyroscope, an electronic compass, and the like.

The warning engine 102 can determine various network connectivity issues or conditions, such as those related to out of service (00S) and call drop events. The warning engine 102 determines these issues and conditions based on information provided by a wireless stack 108 of the computing device, a local database 110 that stores connection event data, such as the OSS and call drop history, for a surrounding area locally on the device, and a remote database 112 that stores and aggregates connection event data for many regions from many devices and provides the computing device with updates. The wireless stack 108 could be, for example, part of the protocol stack that implements the Global System for Mobile Communications (GSM), the Universal Mobile Telecommunications System (UMTS), the 3GPP Long Term Evolution (LTE) and marketed as 4G LTE, WiMax, WiFi, and/or various other communication networks and/or standards. The wireless stack 108 is closely integrated with the underlying layers of the protocol stack governing and implementing these communication standards and, as a result, has intimate knowledge of connection conditions and events between the computing device and these networks. Accordingly, the wireless stack 108 enables an application in communication therewith to have access to a device's whole eco-system, from the highest application level to the lowest layers of the protocol stack, enabling efficient, timely, and accurate connection event determination and network system conditions for notifying users.

For example, the protocol stack is alerted in advance when a computing device is about to lose connection with a network. When signal strength for a particular cell site falls below a predetermined threshold, the computing device is given a short period of time (in some systems, approximately 12 seconds) to locate a new cell site. If an alternate cell site is not located within that given period of time, the connection is severed. In various embodiments, once signal strength falls below the predetermined threshold, the wireless stack 108 can send a notification to the warning engine 102 that the computing device is about to lose connection with the network, as the computing device attempts to locate a new cell site. Likewise, the protocol stack is alerted in advance when the computing device is coming back into an area of network service. In this case, the protocol stack is aware of sufficient signal strength, but there is a lag time between sensing the signal and establishing a connection due to network authentication for security purposes. Accordingly, the wireless stack 108 can tip off the warning engine 102 upon coming back into service. As discussed above, the warning engine 102 sends the type of event to the user notification engine 104, which subsequently displays a notification to a user via the display screen 106. The notification could alternatively, or additionally, be audible, such as an alarm, recorded message either whispered or spoken, or a vibration.

Approaches in accordance with various embodiments can additionally infer various circumstances or conditions indicative of various connection events based on a network's topology in a particular region. For example, the user could be notified when approaching an area historically associated with poor signal strength, poor connection reliability, or frequent dropped calls based on historically collected data, such as connection event data. As mentioned above, the connection event data is information compiled from past connection events from many devices and the data can be utilizes to identify areas associated with poor coverage and, in addition, can be utilized to determine areas historically associated with greater connection reliability or dependability. For example, upon entering a region, the remote database 112 provides a computing device connection event data for the region and the device saves the data in the local database 110. In this example, a user's location is monitored using at least one of the GPS sensor 114, the WiFi triangulation module 116, or the assisted GPS (A-GPS) module 118 and, upon approaching a location in a region that the connection event data has associated with poor signal coverage, the user notification engine 104 can notify the user. In another example, a particular area might be prone to many handovers or reselections, such as an area on a border of multiple cell sites. Connection reliability in such an area could be sufficient, but being subject to multiple handovers and reselection in a certain period of time increases the chances of a call being dropped. In this example, the wireless stack 108 can send a notification to the warning engine 102, as the computing device is approaching such a border, and provide an appropriate notification to the user notification engine 104. In this example, the warning engine 102 may additionally receive a notification from the local database 110 based on the connection event data indicating a greater than normal number of dropped calls for that particular location. In other examples, a user could be notified when a hard handover is imminent, when approaching a Location Area (LA)/Routing Area (RA) border or a tracking area (TA), when the computing device is experiencing a high blocking rate of CFC errors or various other types of lower level protocol stack errors, when subject to a predetermined number of retransmissions, or if attach or Packet Data Protocol (PDP) activation has failed.

Various types of notifications and warnings can be provided to users based on different circumstances. To better understand an approach that can be utilized in accordance with various embodiments, FIG. 2 illustrates an example map 200 for a region with varying levels of connection reliability associated with signal strength. The map 200 includes an intersection 202 and three routes (204, 206, 208) that a user standing at the intersection 202 could choose to take. Each of the routes (204, 206, 208) is associated with a different level of signal strength as a result of various conditions and/or network topology. In this example, the shadow area 210 represents an area of poor signal strength within the region. Conventionally, mobile devices display a set of bars of varying heights that represent signal strength. This convention is used to illustrate the various levels of signal strength (212, 214, 216) associated with the routes (204, 206, 208). In this example, route 204 is associated with poor signal strength 212, route 206 is associated with a medium signal strength 214, and route 208 is associated with a strong signal strength 216. For example, a computing device utilizing the teachings herein can be configured to notify or warn a user walking through the intersection 202 and approaching route 206 while on a phone call. The warning can include a message indicating an optimal location for continuing the call or an optimal direction to travel to best ensure the call's success. The warning can additionally include a probability of success associated with a particular location or along a particular route or path based on the connection event data associated with this particular region. Further, as the user walks along route 206, while on the call, the user can be notified that a local area of optimal signal strength is located to the east, toward route 208. In another example, upon attempting to make a call, the user walking along route 204 can receive a notification for being in an area associated with poor signal strength. The notification can include, as in the previous example, a location of an area with optimal signal strength and a suggestion or recommendation for the user head toward the identified location before making the call to ensure a reliable connection with the network.

Accordingly, users can receive notifications upon at least entering areas of poor network coverage; upon entering areas associated with multiple handovers and reselections; or upon entering densely populated areas with insufficient cell sites for handling current traffic levels, for example, during peak hours or during special events where many people are attempting to access a network. Further, users can receive notifications when their devices are about to go out of service, such as experiencing a radio link failure, or when their devices are about to come back into service. In at least some embodiments, the notifications can include suggestions or recommendations for the user to move to a different location to either place a call or during a call to ensure that the network connection is not severed and the call is not dropped. The notifications can also include directions to the identified locations associated with at least sufficient network coverage.

Various techniques can be used to return a user to areas of network coverage when network coverage and GPS coverage have been either completely or momentarily lost, such as in an underground parking lot or in an area far away from any cell sites or related transmitter. In one example, a radio frequency (RF) Doppler can be used to retrace a user's location back to where the user last had network coverage. Typically, as a computing device moves, it transmits an RF signal whose Doppler-shifted frequency is measurable by a monitoring system. Such measurements enable the calculation of the position and movement of a computing device, which can be used to retrace a device's movement, for example. Accordingly, a notification, when all network connections and GPS are unavailable, can include directions to the user's last known location with network connection using a combination of RF Doppler and the locally saved connection event information for the event that caused the user to lose network connection. Further, an RF Doppler could be used to determine, for example, a user's z-component location, such as when a user is in a multi-storied building or house. For example, a user may have sufficient network coverage on the $4^{th}$ floor, but insufficient coverage on the $6^{th}$ floor and a conventional GPS sensor would not be able to make this distinction.

Figure 3A:
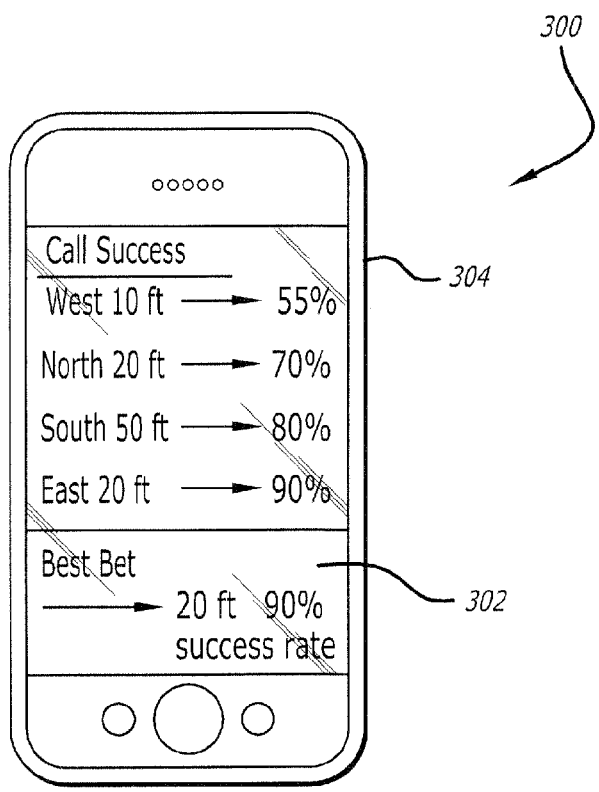
FIGS. 3A and 3B illustrate two example notifications for directing a user to areas of greater signal strength in accordance with various embodiments.
Figure 3B:
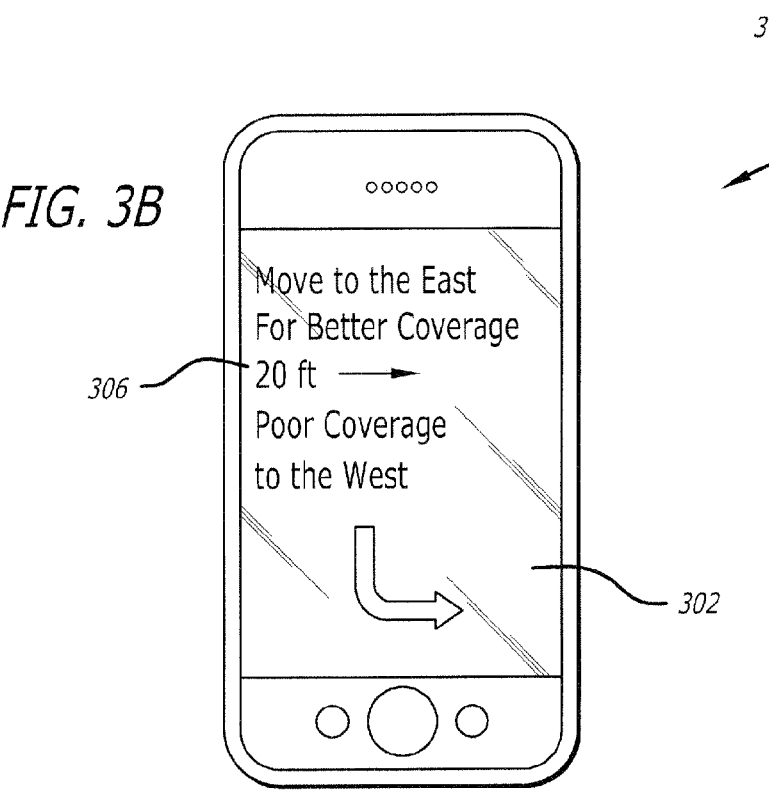

FIGS. 3A and 3B illustrate two examples notifications on a user interface of a computing device 300 in accordance with various embodiments. FIG. 3A illustrates an example computing device 300 wherein a notification 304 is presented to the user via a display element 302 on the device. In this example, the computing device 300 has determined call success probabilities for locations near the user and provided this information in the notification 304. The notification 304 can, for example, be presented at least when a user attempts to make a phone call in an area with poor service, signal strength, connection reliability, or coverage or during a call when approaching such an area. FIG. 3B illustrates another example notification 306 presented to a user via the computing device 300. In this example, the notification includes directions to an optimal location to place a call or to continue on a call without potential interruption. In this example, the message states "Move to the East 20 ft for better coverage, poor coverage to the West." It should be understood that additional, less, or alternative information can be presented to the user in similar or alternative notifications.

The notifications in accordance with various embodiments can additionally be provided with one or more audible and/or physical alerts. Accordingly, if a user is on a phone call and the user's computing device has determined that the user is heading toward an area of poor connection reliability, the device could alert the user by, for example, vibrating and displaying a message notification as discussed above. Further, if the user continues to head in the same direction, the user could be alerted by a second notification that may include a vibration, the message notification, and a beep. If the user has not changed course in response to the first two alerts, the device could additionally interrupt the call with a verbal message, such as with synthesized speech, for example. In this example, the device could vibrate and display the notification when the user is, for example, 10 feet from a location associated with dropped calls, the device could beep when the device is 5 feet from the location, and the device could interrupt the phone call with the verbal message when the device is 2 feet away from the location. Various other alerts and combinations thereof are also possible.

Figure 4:
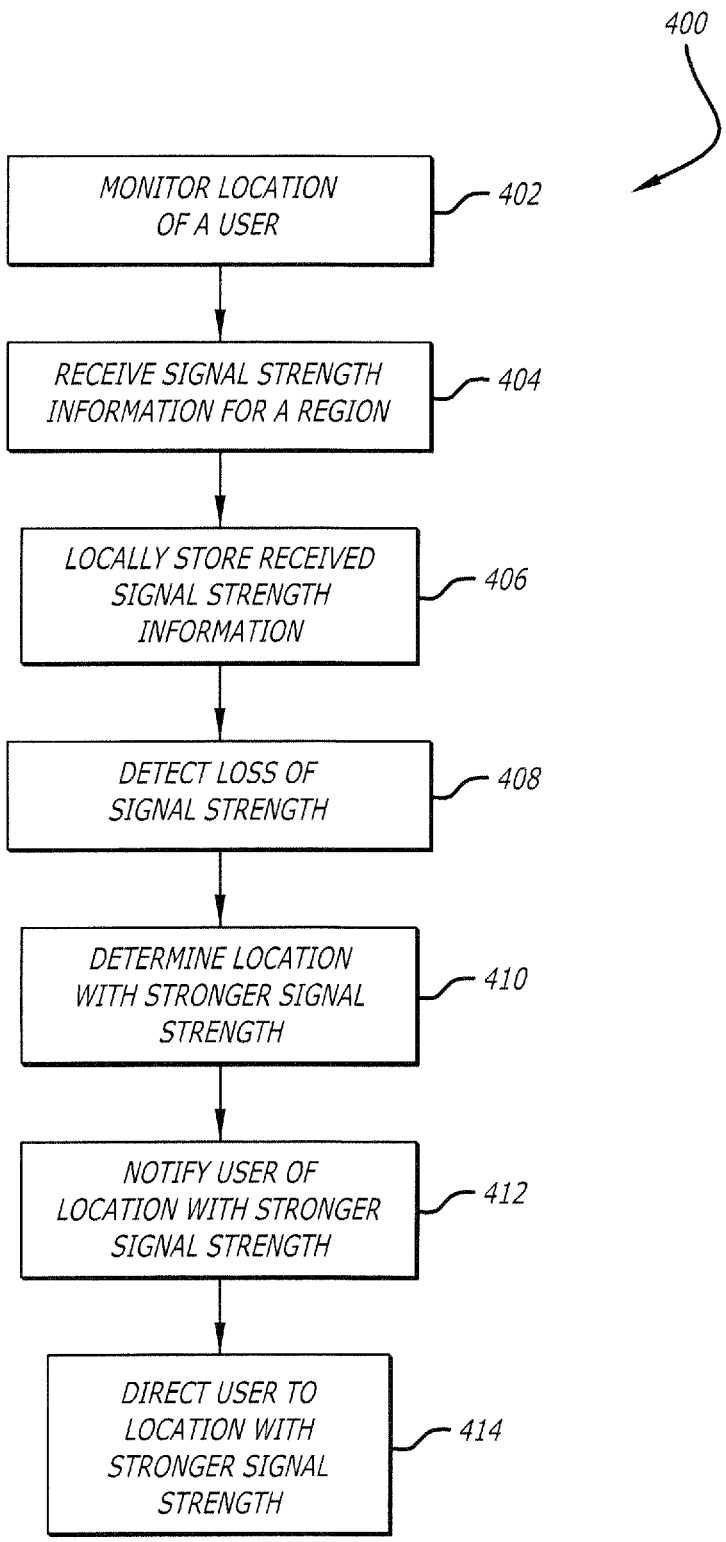
FIG. 4 illustrates an example process in accordance with various embodiments.

FIG. 4 illustrates an example process 400 for warning a user of areas of poor connection reliability, making recommendations of areas of greater connection reliability, and guiding the user to these areas in accordance with various embodiments. In this example, position information for a user is monitored over time 402. In this example, connection reliability information for a region is obtained 404 and stored locally on the computing device 406. The connection reliability information or connection event data is typically obtained when a computing device enters a new region or upon powering up. In one example, an application could mine various other applications on the device for information about a user's plans or movements and, based on those plans or movements, receive updates in advance for regions associated therewith. For example, a user's calendar application could be mined for event data for a user planning a road trip. The application could download connection reliability information associated with the location and route of the planned trip in advance, for example. A connection event, such as a loss of signal strength, is detected by the computing device within the region while the user is on a phone call 408. Further, in this example, the computing device could detect that the user is approaching an area historically associated with lower signal strength based on the locally stored connection reliability information. Based in part on the locally stored connection reliability information, a location with greater connection reliability within the region is determined or identified 410. The user is notified during the phone call of the location with greater connection reliability 412 and the user is directed to the location based in part on information provided by the locally stored connection reliability information 414.

Figure 5:
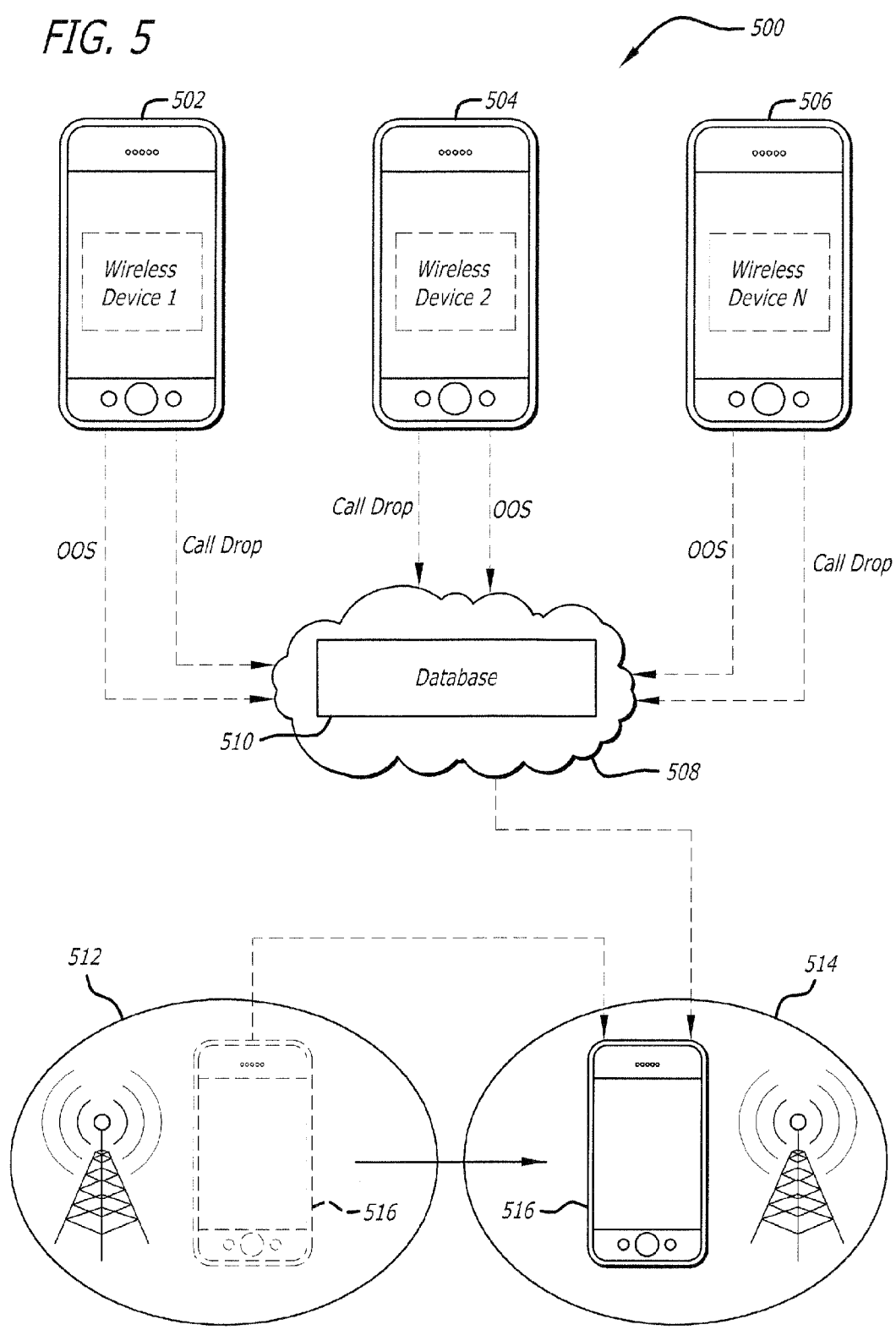
FIG. 5 illustrates an example flow of connection event data in an environment in accordance with various embodiments.

FIG. 5 illustrates an example environment 500 showing the flow of out of service and call drop information from one or more computing devices (502, 504, 506) to a database 510 through a network 508, then eventually back through the network 508 to a computing device 516 as the device is updated with the information when moving from a first cell site region 512 to a second cell site region 514 in accordance with various embodiments. Each time the one or more computing devices (502, 504, 506) encounters a connection event or network problem, such as a dropped call or experiences an inability to connect to a cellular or data network, for example, the information associated with the event is locally saved on the computing device. The saved information can include the unique number identifier of the base transceiver station (BTS), NodeB for a Wideband Code Division Multiple Access (WCDMA) system, eNodeB for a Long Term Evolution (LTE) system, or cell ID (CID) of the particular cell site where the event occurred, the UPS coordinates of the event, the Public Land Mobile Network (PLMN) ID, sometimes known as the Location Area Identity (TAI), which is a unique identifier given to each location area of the PLMN, and a cause of the connection event. Further, the information could also include the time of day the event took place. For example, maybe calls are only dropped during the day or during a particular busy period each day, and network coverage is adequate at night. When the computing device comes back into service or reconnects back to the network, for example, the locally saved information is uploaded to the database 510. By aggregating the information, the database 510 can identify areas of potential coverage weakness within a region and develop a topological connection reliability map in accordance with various embodiments. Each connection problem or event is a new data point on the coverage map and, thus, the map or data image is continually updated and evolves over time and as conditions of a network change.

The coverage information is eventually provided to the computing devices (502, 504, 506) when a computing device moves from an area covered by one cell site to an area covered by another cell site as shown in FIG. 5, or upon power up. The area covered by a cell site is typically around 1-2 miles (2-3 km) in suburban areas, but can be much closer, such as ¼-½ mile (400-800 m), in densely populated areas. Thus, when the computing device 516 enters a new region covered by a new cell site, the device is typically provided with information about the few surrounding miles, which can equate to information for multiple cell sites in densely populated areas. Generally, in areas where there are enough cell sites to cover a wide area, the range of each cell site will be set to ensure there is enough overlap for a "handover" to and from other cell sites. In this example, as the computing device 516 moves from the first cell site region 512, there is handover to the second cell site region 514. A handover is, therefore, the transfer of a signal for a computing device from one cell site to another, such as when a user is on a phone call while traveling in a car. As the user on the phone call moves away from the first cell site region 512 toward the second cell site region 514, the computing device 516 monitors which signal is stronger and, as the signal from the second cell site region 514 becomes stronger than the signal from the first cell site region 512, the first cell site releases the signal as the signal is picked up by the second cell site.

There are two types of handovers, a hard handover and a soft handover. A hard handover is when a channel occupied by the computing device 516, for example, of the first cell site region 512 or source is released and, only then, a channel in the second cell site region 514 or target is engaged. Thus, the connection to the source is broken before or as the connection to the target is made. In contrast, a soft handover is one in which the channel in the source cell site of region 512 is retained and used while in parallel with the channel in the target cell site of region 514 for a period of time to ensure a smooth transition. In this instance, the connection to the target cell site is established before the connection to the source site is broken.

Figure 6:
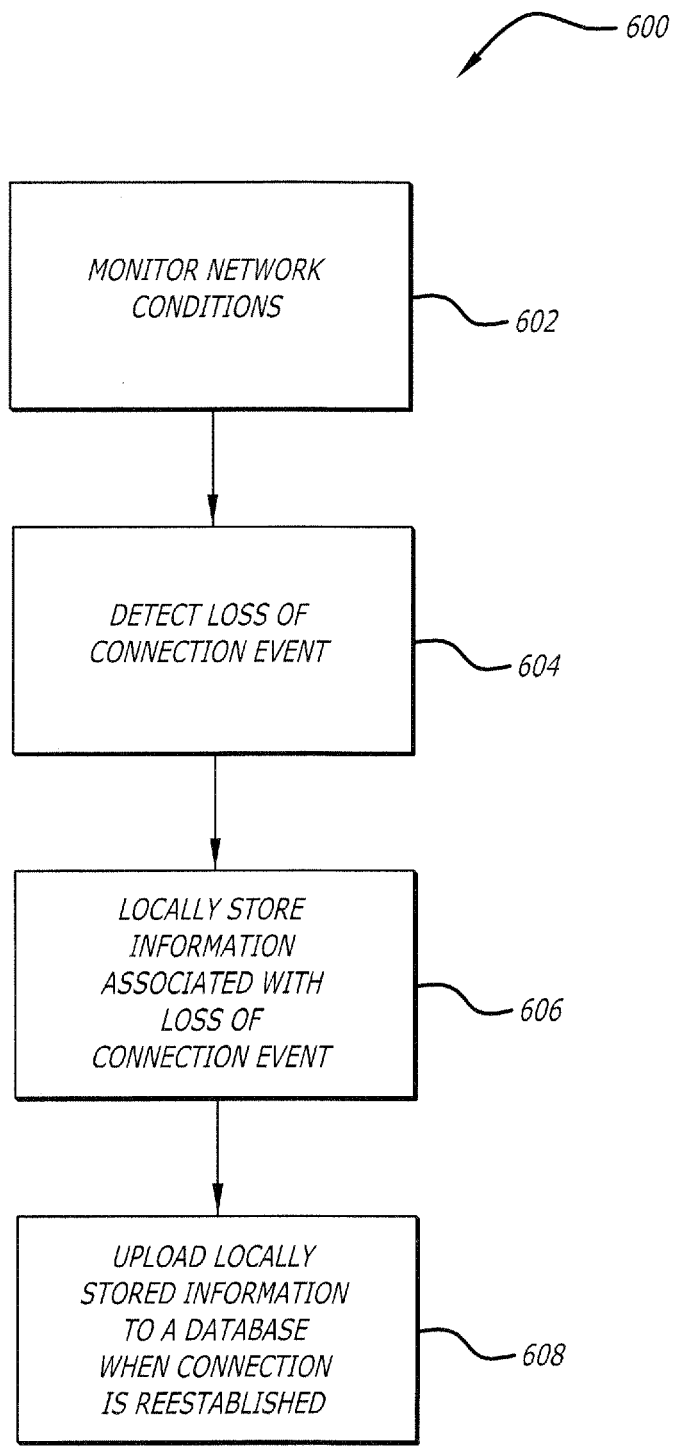
FIG. 6 illustrates another example process in accordance with various embodiments.

FIG. 6 illustrates an example process 600 for updating one or more servers with network connection event information in accordance with various embodiments. In this example, a computing device monitors one or more networks for various connection related conditions 602. In this example, a connection related condition, such as a loss of connection, is detected 604. In this example, the loss of connection is between a computing device, such as a smart phone or a tablet computer, and a network, such as a cellular network or wide area network (WAN), for example. In this example, information associated with the loss of connection is stored locally on the computing device 606. Typically, a connection event occurs as a result of being out of service or as a result of a momentary loss of connection to the network. In some cases, in order to upload the information associated with the loss of connection information, connection to the network must be reestablished or the computing device must return to an area of service. Thus, in this example, the locally stored loss of connection information, such as the cell ID, the GPS coordinates, the PLMNID, and/or cause of the connection event, is uploaded to a database when connection to the network is reestablished 608. In another example, a computing device could lose connection to a cellular network while maintaining a connection to a data network through, for example, a Wi-Fi connection. The database receives connection event information from a plurality of computing devices for many locations and stores the information for various regions. This information is continually updated as more information or data is received from the plurality of computing devices. Further, the database then provides an aggregation of the data to a computing device when the computing device enters a new region. The information can be requested by the computing device, automatically pulled by the device from the database, or the database could monitor the location of the device and automatically push the information updates to the device as the device enters a new region.

Approaches in accordance with various embodiments can support communication over a cellular telephone/radio network or a wireless data network, such as over a wireless local network (WLAN), a WIFI network, and 3G and 4G network to name a few. The ability to communicate using a data network allows calls, for example, to be routed via the data network or a wireless link of the cellular telephone network. Further, a call can be handed off between the cellular network and the data network without disrupting a call in various embodiments. The ability to communicate using a data network further allows communication with mobile phone users, for example, through other devices on a data network, such as a personal computer, a software-based Voice over IP (VoIP) phone on a personal computer, or a VoIP desk phone. The ability to utilize both cellular and data networks allows calls to be placed to the mobile phone to be routed via the local area network rather than or in addition to being routed over a cellular telephone radio network.

Figure 7A:
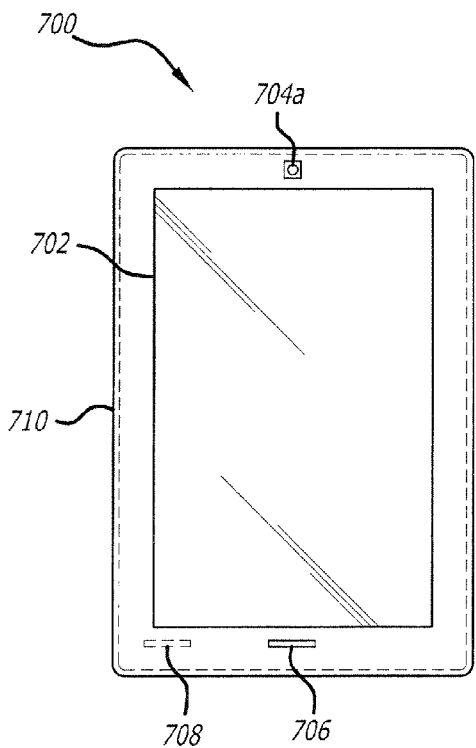
FIG. 7 illustrates an example computing device that can be used in accordance with various embodiments.
Figure 7B:
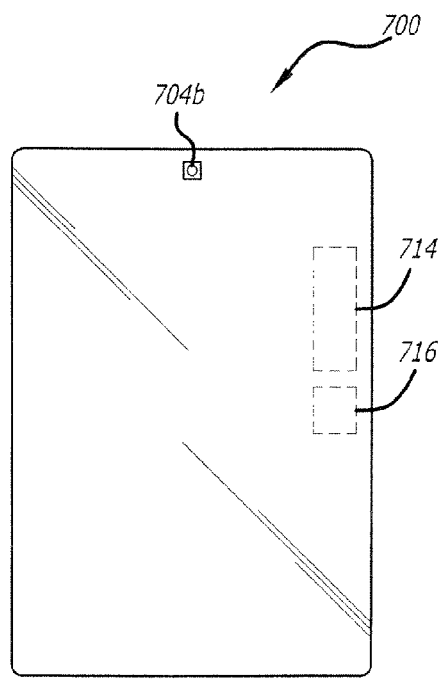

FIGS. 7A and 7B illustrate front and back views, respectively, of an example portable computing device 700 that can be used in accordance with various embodiments. Although one type of portable computing device (e.g., a smart phone, an electronic book reader, or tablet computer) is shown, it should be understood that various other types of electronic devices that are capable of determining, processing, and providing input can be used in accordance with various embodiments discussed herein. The devices can include, for example, notebook computers, personal data assistants, cellular phones, video gaming consoles or controllers, and portable media players, among others.

In this example, the portable computing device 700 has a display screen 702 (e.g., a liquid crystal display (LCD) element) operable to display image content to one or more users or viewers of the device. In at least some embodiments, the display screen provides for touch or swipe-based input using, for example, capacitive or resistive touch technology. Such a display element can be used to, for example, enable a user to provide input by pressing on an area of the display corresponding to an image of a button, such as a right or left mouse button, touch point, etc. The device can also have touch and/or pressure sensitive material 710 on other areas of the device as well, such as on the sides or back of the device. While in at least some embodiments a user can provide input by touching or squeezing such a material, in other embodiments the material can be used to detect motion of the device through movement of a patterned surface with respect to the material.

The example portable computing device can include one or more image capture elements for purposes such as conventional image and/or video capture. As discussed elsewhere herein, the image capture elements can also be used for purposes such as to determine motion and receive gesture input. While the portable computing device in this example includes one image capture element 704 on the "front" of the device and one image capture element 712 on the "back" of the device, it should be understood that image capture elements could also, or alternatively, be placed on the sides or corners of the device, and that there can be any appropriate number of capture elements of similar or different types. Each image capture element may be, for example, a camera, a charge-coupled device (CCD), a motion detection sensor, or an infrared sensor, or can utilize another image capturing technology.

The portable computing device can also include at least one microphone 706 or other audio capture element capable of capturing audio data, such as may be used to determine changes in position or receive user input in certain embodiments. In some devices there may be only one microphone, while in other devices there might be at least one microphone on each side and/or corner of the device, or in other appropriate locations.

The device 700 in this example also includes at least one motion- or position-determining element 708 operable to provide information such as a position, direction, motion, or orientation of the device. These elements can include, for example, accelerometers, inertial sensors, electronic gyroscopes, electronic compasses, and GPS elements. Various types of motion or changes in orientation can be used to provide input to the device that can trigger at least one control signal for another device. The example device also includes at least one communication mechanism 714, such as may include at least one wired or wireless component operable to communicate with one or more portable computing devices. The device also includes a power system 716, such as may include a battery operable to be recharged through conventional plug-in approaches, or through other approaches such as capacitive charging through proximity with a power mat or other such device. Various other elements and/or combinations are possible as well within the scope of various embodiments.

Figure 8:
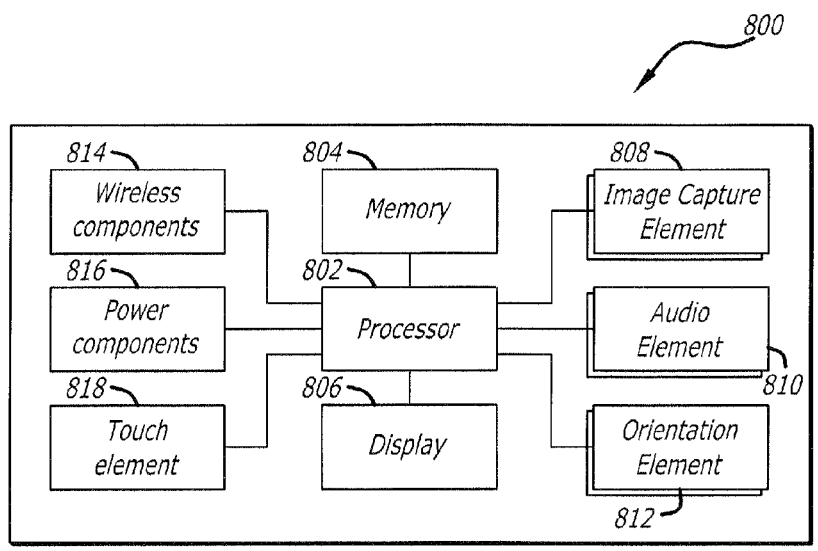
FIG. 8 illustrates an example configuration of components of a computing device such as that illustrated in FIG. 7.

In order to provide functionality such as that described with respect to FIGS. 7A and 7B, FIG. 8 illustrates an example set of basic components of a portable computing device 800, such as the device 700 described with respect to FIGS. 7A and 7B. In this example, the device includes at least one processor 802 for executing instructions that can be stored in at least one memory device or element 804. As would be apparent to one of ordinary skill in the art, the device can include many types of memory, data storage or computer-readable storage media, such as a first data storage for program instructions for execution by the processor 802, the same or separate storage can be used for images or data, a removable storage memory can be available for sharing information with other devices, etc.

The device typically will include some type of display element 806, such as a touch screen, electronic ink (e-ink), organic light emitting diode (OLED) or liquid crystal display (LCD), although devices such as portable media players might convey information via other means, such as through audio speakers. As discussed, the device in many embodiments will include at least one image capture element 808, such as one or more cameras that are able to image a user, people, or objects in the vicinity of the device. In at least some embodiments, the device can use the image information to determine gestures or motions of the user, which will enable the user to provide input through the portable device without having to actually contact and/or move the portable device. An image capture element also can be used to determine the surroundings of the device, as discussed herein. An image capture element can include any appropriate technology, such as a CCD image capture element having a sufficient resolution, focal range and viewable area, to capture an image of the user when the user is operating the device.

The device, in many embodiments, will include at least one audio element 810, such as one or more audio speakers and/or microphones. The microphones may be used to facilitate voice-enabled functions, such as voice recognition, digital recording, etc. The audio speakers may perform audio output. In some embodiments, the audio speaker(s) may reside separately from the device.

The device can include at least one additional input device that is able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

The device 800 in this example also includes at least one motion- or position-determining element 812 operable to provide information such as a position, direction, motion, or orientation of the device. These elements can include, for example, accelerometers, inertial sensors, electronic gyroscopes, electronic compasses, and GPS elements. Various types of motion or changes in orientation can be used to provide input to the device that can trigger at least one control signal for another device.

The example device also includes one or more wireless components 814 operable to communicate with one or more portable computing devices within a communication range of the particular wireless channel. The wireless channel can be any appropriate channel used to enable devices to communicate wirelessly, such as Bluetooth, cellular, or Wi-Fi channels. It should be understood that the device can have one or more conventional wired communications connections as known in the art. The example device includes various power components 816 known in the art for providing power to an portable computing device, which can include capacitive charging elements for use with a power pad or similar device as discussed elsewhere herein. The example device also can include at least one touch- and/or pressure-sensitive element 818, such as a touch sensitive material around a casing of the device, at least one region capable of providing squeeze-based input to the device, etc. In some embodiments this material can be used to determine motion, such as of the device or a user's finger, for example, while in other embodiments the material will be used to provide specific inputs or commands.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g. a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 9:
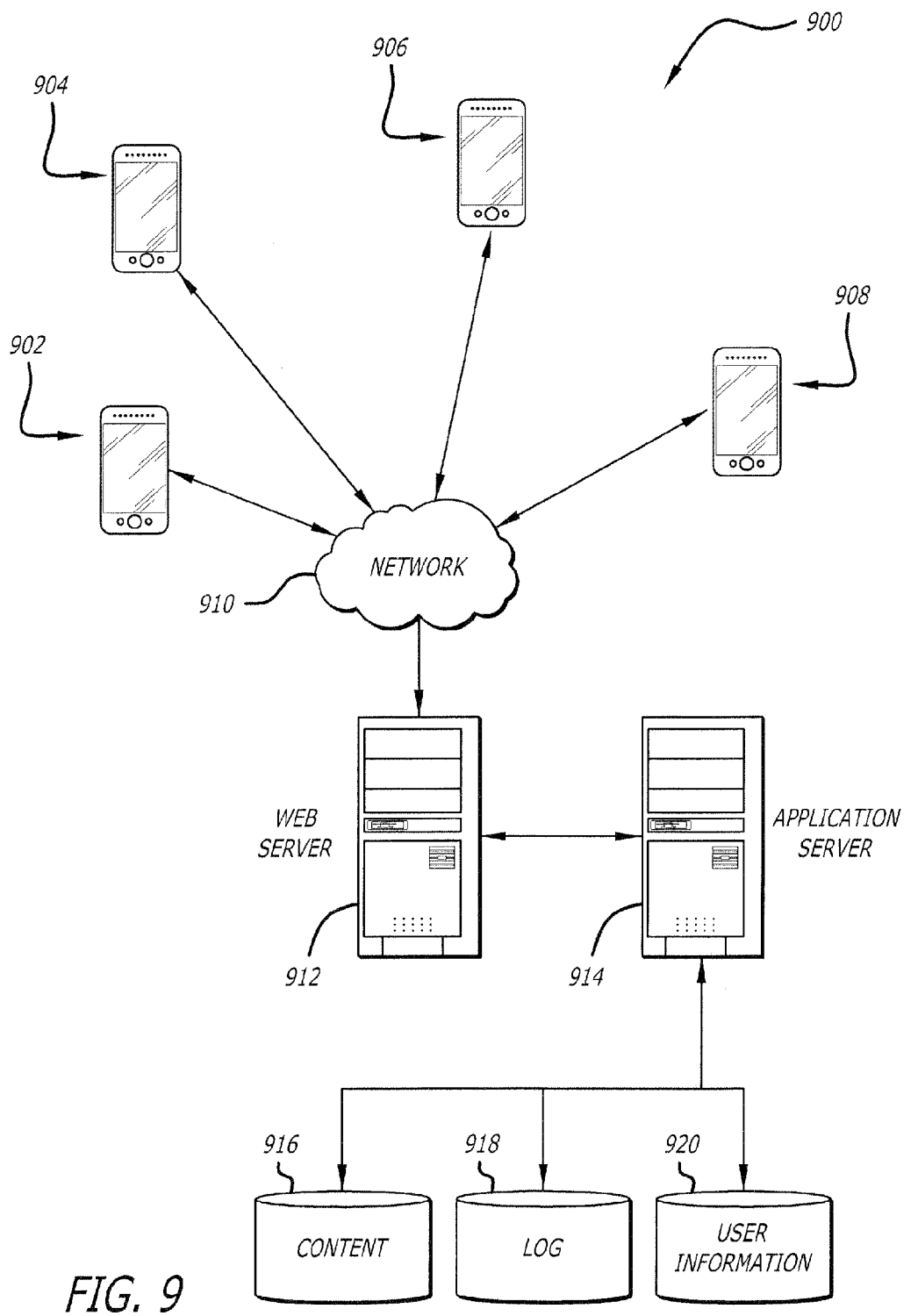
FIG. 9 illustrates an example environment in which various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks, an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 906 in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing content (e.g., production data) 912 and user information 916, which can be used to serve content for the production side. The data store is also shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s)

may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device.

Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   under the control of one or more computer systems configured with executable instructions,
      obtaining, by a computing device, connection reliability information associated with a plurality of geographic locations in a geographic region for at least one communications network, the connection reliability information associated with a given geographic location being indicative of a connectivity strength between one or more computing devices and the at least one communications network at the given geographic location;
      based at least in part on the obtained connection reliability information, determining a first geographic location being associated with a decrease in the connectivity strength while the computing device is engaged in telephonic communication, within the geographic region, with another computing device, the first geographic location corresponding to at least one of a current location of the computing device or a location toward which the computing device is moving;
      based at least in part on the obtained connection reliability information, determining a second geographic location within the geographic region associated with the connectivity strength greater than the connectivity strength at the first geographic location;
      generating a notification indicative of a potential decrease in connectivity strength at the first geographic location, and directions to the second geographic location associated with greater connectivity strength;
      generating an indication of a probability of success, associated with the second geographic location based on the obtained connection reliability information, of continuing the telephonic communication with the other computing device; and
      displaying, on the computing device, the notification indicative of the potential decrease, the directions to the second geographic location, and the indication of the probability of success.

2. The computer-implemented method of claim 1, further comprising:
   storing, by the computing device, information associated with the decrease in the connectivity strength at the first geographic location; and
   sending the information to a server configured to store the information.

3. The computer-implemented method of claim 1, wherein the connection reliability information includes one or more of information associated with historical dropped connection events associated with the at least one communications network in the geographic region or information associated with geographic locations having poor or inconsistent strength of connectivity within the geographic region, the information being compiled from a plurality of computing devices operating within the geographic region over time.

4. The computer-implemented method of claim 1, further comprising:
   determining whether the decrease in the connectivity strength at least meets a threshold; and
   providing the notification for the second geographic location.

5. A computer-implemented method, comprising:
   under the control of one or more computer systems configured with executable instructions,
      receiving connection event information associated with a plurality of geographic locations for a geographic region;
      detecting, while a computing device is engaged in telephonic communication with another computing device, a connection event associated with the computing device at a first geographic location, the connection event indicative of a decrease in connectivity strength associated with a communication between the computing device and a communications network;
      in response to detecting the connection event at the first geographic location and based at least in part on the connection event information, determining a second geographic location where the connectivity strength is greater than the connectivity strength at the first geographic location;
      generating a notification indicative of a potential decrease in connectivity strength at the first geographic location, and directions to the second geographic location;
      generating an indication of a probability of success, associated with the second geographic location based on the connection event information, of continuing the telephonic communication with the other computing device; and
      causing the computing device to display the notification indicative of the potential decrease, the directions to the second geographic location, and the indication of the probability of success.

6. The computer-implemented method of claim 5, further comprises:
   causing at least a portion of the connection event information for the geographic region to be stored locally on the computing device.

7. The computer-implemented method of claim 6, further comprises:
   sending connection event information to the computing device for a second geographic region when a user is within a distance of the second geographic region.

8. The computer-implemented method of claim 6, wherein the connection event information includes at least one of information associated with dropping of a communication connection between the communications network and one or more associated computing devices, or a given geographic location having less than a threshold connectivity strength.

9. The computer-implemented method of claim 6, further comprising:
   monitoring a geographic location of the computing device within the geographic region; and
   checking the locally stored connection event information to determine whether the computing device is approaching an area associated with lower connectivity strength.

10. The computer-implemented method of claim 5, further comprising:
    when the connection event is a dropped connection, causing information associated with the dropped connection to be stored locally on the computing device; and
    making the locally stored information associated with the dropped connection available to a server.

11. The computer-implemented method of claim 5, wherein the notification includes one or more directions to the second geographic location.

12. The computer-implemented method of claim 5, further comprising:
    when the connection event is a dropped call, determining a route to the second location using a radio frequency (RF) Doppler algorithm; and
    providing directions to the second location based at least in part on the determined route.

13. A computing system associated with a communications network, comprising:
    at least one processor; and
    memory including instructions that, when executed by the at least one processor, cause the computing system to:
       maintain, for each of a plurality of geographic regions, connection reliability information associated with a plurality of geographic locations within the geographic region, wherein the connection reliability information associated with a given geographic location is indicative of a connectivity strength of the communications network while engaged in telephonic communication with one or more other portable computing devices at the given geographic location;
       provide, in response to a computing device approaching a first geographic region of the plurality of geographic regions, at least a portion of the connection reliability information corresponding to the first geographic region to the computing device;
       generate, in response to a decrease in the connectivity strength being detected by the computing device, directions from the first geographic region to a second geographic region, the connectivity strength associated with the communications network being greater at the second geographic region relative to the first geographic region;
       send, to the computing device for display, a notification including the directions to the second geographic location; and
       send, to the computing device for display, an indication of a probability of success, associated with the second geographic location based on the connection reliability information, of continuing the telephonic communication with the one or more portable computing devices.

14. A computing device, comprising:
    a device processor;
    a display screen; and
    a memory device including instructions operable to be executed by the processor to perform a set of actions, enabling the computing device to:
       receive connection event information associated with a plurality of geographic locations for a geographic region;
       detect, while the computing device is engaged in telephonic communication with another computing device, a connection event associated with the computing device at a first geographic location, the connection event indicative of a decrease in connectivity strength associated with a communication between the computing device and a communications network;
       in response to detecting the connection event at the first geographic location and based at least in part on the connection event information, determining a second geographic location where the connectivity strength is greater than the connectivity strength at the first geographic location;

generate a notification indicative of a potential decrease in connectivity strength at the first geographic location, and directions to the second geographic location;

generate an indication of a probability of success, associated with the second geographic location based on the connection event information, of continuing the telephonic communication with the other computing device; and display, on the display screen, the notification indicative of the potential decrease, the directions to the second geographic location, and the indication of the probability of success.

15. The computing device of claim 14, wherein the notification includes at least one of a vibration, an alarm, or a verbal message.

16. The computing device of claim 14, wherein the notification includes directions to the second geographic location from the first geographic location.

17. The computing device of claim 14, wherein the instructions, when executed by the device processor, further causes the computing device to:

monitor a geographic location of the computing device within a region; and check locally stored connection event information to determine whether the computing device is approaching an area associated with lower connectivity strength.

18. A non-transitory computer-readable storage medium storing instructions that, when executed by at least one processor of a portable computing device, cause the portable computing device to:

receive connection event information associated with a plurality of geographic locations for a geographic region;

detect, while the portable computing device is engaged in telephonic communication with another computing device, a connection event associated with the portable computing device at a first geographic location, the connection event indicative of a decrease in connectivity strength associated with a communication between the portable computing device and a communications network;

in response to detecting the connection event at the first geographic location and based at least in part on the connection event information, determine a second geographic location where the strength of connectivity is greater than the connectivity strength at the first geographic location;

generate a notification indicative of a potential decrease in connectivity strength at the first geographic location, and directions to the second geographic location;

generate an indication of a probability of success, associated with the second geographic location based on the connection event information, for continuing the telephonic communication with the other computing device; and display the notification indicative of the potential decrease, the directions to the second geographic location, and the indication of the probability of success.

19. The non-transitory computer-readable storage medium of claim 18, wherein the first geographic location of the portable computing device is determined using at least one of a global positioning system (GPS) sensor, WiFi triangulation, or a radio frequency Doppler algorithm.

20. The non-transitory computer-readable storage medium of claim 18, wherein the second geographic location is determined using connection reliability information stored locally on the portable computing device.

21. The non-transitory computer-readable storage medium of claim 18, wherein the second location is determined using connection reliability information stored remotely on a server.

* * * * *